United States Patent [19]

Wittrisch

[11] Patent Number: 4,877,095

[45] Date of Patent: Oct. 31, 1989

[54] STOPPER FOR CABLE PASSAGES OR CONDUITS

[75] Inventor: Christian Wittrisch, Rueil-Malmaison, France

[73] Assignee: Institut Francais du Petrole, Rueil-Malmaison, France

[21] Appl. No.: 211,258

[22] Filed: Jun. 24, 1988

[30] Foreign Application Priority Data

Jun. 25, 1987 [FR] France ................................. 87 09007

[51] Int. Cl.$^4$ ........................ E21B 17/00; E21B 34/14
[52] U.S. Cl. .................................... 175/237; 166/65.1;
166/117.5; 166/385; 166/329; 175/317;
137/533.11
[58] Field of Search ................. 166/65.1, 77, 385, 328,
166/329, 325, 242, 117.5, 97; 174/47; 175/237,
317; 137/533.11, 519.5, 516.25

[56] References Cited

U.S. PATENT DOCUMENTS

| | | | |
|---|---|---|---|
| 398,111 | 2/1889 | Abbot et al. | 137/516.25 X |
| 3,424,247 | 1/1969 | Lee | 166/329 |
| 3,602,304 | 8/1971 | Mallinger et al. | 166/65.1 X |
| 3,850,191 | 11/1974 | Brown | 166/329 X |
| 4,070,239 | 1/1978 | Bevilacqua | 137/533.11 X |
| 4,266,605 | 5/1981 | LaBorde et al. | 166/329 X |
| 4,597,449 | 7/1986 | Kenney | 166/385 X |
| 4,603,578 | 8/1986 | Stoltz | 166/242 X |
| 4,607,693 | 8/1986 | Richardson | 166/242 |
| 4,660,635 | 4/1987 | Wittrisch | 166/385 X |

Primary Examiner—Stephen J. Novosad
Attorney, Agent, or Firm—Antonelli, Terry & Wands

[57] ABSTRACT

Stopper, for cable passages or conduits, having a first chamber placed in said passage, said chamber comprising at least one bearing surface placed in this passage and adapted to cooperate with a closure element, a second chamber opening into the first chamber, said closure element being housed in said second chamber in a first position of the stopper, and means for moving the closure element in the first chamber to a second position of the stopper, where the cable is withdrawn from the passage, further comprising a separating member, situated between said first chamber and said second chamber, this member being adapted for controlling the movement of the closure element from the second chamber to the first chamber.

18 Claims, 1 Drawing Sheet

STOPPER FOR CABLE PASSAGES OR CONDUITS

BACKGROUND OF THE INVENTION

1. Field of the Invention

The present invention relates to equipment for pipe strings such as drill pipe strings comprising a side entry sub for passing the cable from the inside to the outside of the pipes, with hydraulic sealing about the cable.

2. Description of the Prior Art

Side entry subs are well known by oil drilling specialists, such a device is described for example in the British patent No. 2 135 719.

A side entry sub is for example used in the technique described in the French patent Nos. 2 501 777 and its first two additions FR-A-No. 2 522 059 and 2 564 893, the patents FR-A-No. 2 502 236, U.S. Pat. Nos. 4,603,578, 4,607,693 or 4,070,239.

According to this technique, for carrying out well logging or work operations in horizontal or highly slanted wells, a well logging probe (or a work tool) is initially fixed to the lower part of a pipe string which is lowered into the well as it is formed.

Then, inside the pipes, an electric cable is lowered (by gravity and pumping) having a weighted connector (the connector may comprise a load bar mounted thereover) which connects with a complementary connector fixed to the top of the probe or tool. In the portion of the pipe string corresponding to the vertical or slightly slanted portion of the well, a side entry sub provides passage of the cable from the inside to the outside of the pipes.

Recording of the measurement (or the work in the well) is executed by displacing the of the entire length of the pipe string from the surface.

SUMMARY OF THE INVENTION

The present invention provides a compact stopper for cable conduits or passages, which stopper is particularly well adapted to be disposed inside a side entry sub.

This topper prevents any fluid flow through the conduit or passage when the cable is withdrawn. Thus, particularly during some operations such as the removing of a pipe string, closure of said passage makes it possible to pressurize the pipe string.

This stopper, especially designed for a conduit or a cable passage, passing through a support, having a first chamber located in this pressure, said chamber comprising at least one bearing surface placed in said passage and adapted to cooperate with a closure element, a second chamber opening into the first chamber, the closure element being housed in the second chamber in a first position of the stopper, and means for moving the closure element in the first chamber to a second position of the stopper, where the cable is withdrawn from the passage, comprises a separating member, located between the first chamber and the second chamber, this member being adapted for controlling the movement of the closure element from the second chamber to the first chamber.

The separating member may be adapted for controlling the movement of the closure element from the first chamber to the second chamber.

The separating member may be controlled by movement of the cable relative to the support.

The first chamber may be located inside the separating member and the displacement means may be fast with the support.

The displacement means may comprise return means such as a spring adapted for introducing the closure element into the first chamber.

The closure may comprise a ball.

The second chamber may be integrated with the support.

This stopper may be placed in a side entry sub.

The displacement means may be adapted for preventing the closure element from returning to the second chamber when the stopper is in the second position.

BRIEF DESCRIPTION OF THE DRAWINGS

The invention will be better understood and all its advantages will be clear from the following description, one embodiment of which is illustrated in the accompanying figures in which.

DESCRIPTION OF THE PREFERRED EMBODIMENTS

Figure 1:
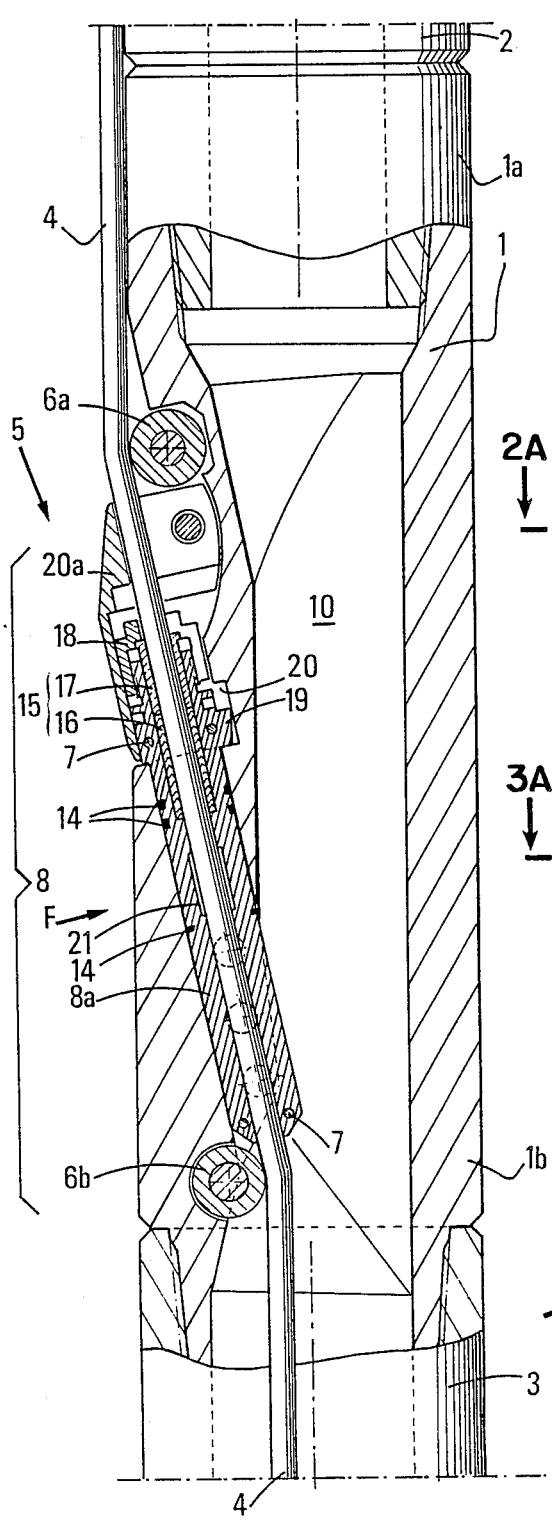
FIG. 1 shows a longitudinal section of the sub using a stopper according to the invention.
Figure 3A:
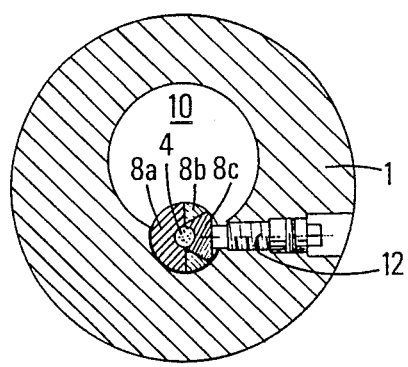
FIG. 3 is a section of the anchorage member through F, namely through a perpendicular plane of longitudinal section of FIG. 1 containing the cable passage axis.
FIG. 3B is a section of the anchorage member through B, namely through a plane perpendicular to the longitudinal sectional plane of FIG. 1, and perpendicular to the axis of the cable passage.

Reference 1 shows the side entry sub screwed by its upper 1a and lower 1b ends respectively to an upper element 2 and a lower element 3 of the pipe string.

This sub comprises a side entry 5 for passing an electric cable 4 from the outside to the inside of the pipes while bearing on guide rollers, an external one 6a and the other 6b inside the sub. This cable is for example of a type used for well logging or work carried out in accordance with a technique described in patent FR-A-No. 2 501 777 and its above mentioned additions.

Member 8 provides sealing about cable 4 between an internal zone 10 of sub 1, or sub crossing 10 and the outside of the sub.

The crossing of sub 10 provides the hydraulic communication of the fluid flowing between the lower 3 and upper 2 internal parts of the pipe string.

Thus, the sub may be connected to a pumping installation adapted for causing a fluid flow for moving measuring or work tools and instruments may be a load bar comprising an electric connector adapted for cooperating with another complementary electric connector.

Member 8 in addition provides anchoring of cable 4 to said sub 1.

The means of sub 1 specifically intended for sealing and supported by member 8 comprise two complementary parts 8a, 8b assembled together by screws 7 and adapted to be placed around the cable 4 and to be sealed to the passage of fluid from the inside to the outside and reciprocally. The inside of these two parts is bored so as to be able to place deformable rings 16 therein and a half moon compression ring 17 and to hold these rings locked in one direction. All these rings, or some of them only, are split to enable positioning thereof once the cable passes through the anchorage member.

A nut 18, having a side opening for fitting about cable 4 and on member 8, compresses the deformable washers 16 so as to provide sealing. The assembly forming the internal sealing means and comprising the two complementary parts 8a, 8b, the deformable washer 16, the compression washer 17 and nut 18 corresponds to the packing generally used for this purpose.

The external sealing means comprise the two complementary parts or bodies 8a, 8b, cooperating with one or more external seals 14, such as an O ring, and the internal wall of sub 1. These means are adapted for preventing any passage of fluid between member 8 and sub 1, particularly at the level of the cable passage stopper, defined further on.

The anchorage member specifically intended for immobilizing cable 4 with respect to sub 1 and supported by member 8 comprises the two complementary parts or bodies 8a, 8b and a clamping element 8c actuated by clamping screws 12.

One 8b of the complementary parts or bodies comprises a widening recess opening on to cable 4, for centering the cable in the anchorage member and in which the clamping element 8c is positioned, which, under the action of stud screws 12 prevents the cable 4 from preventing fluid from passing between their body and the holes in which they are housed.

The studs of these screws 12 act on the clamping element 8c through release surfaces 13a, 13b.

The release surfaces comprise a portion without slant 13a, on which the stud of one of the screws 12 bears, followed by a portion 13b, such that the clearance between stud and anchorage member 8c increases abruptly. The surface has then a crenellated shape 13a, 13b where the tops 13a correspond to the clamping positions of the clamping element 8c and where the indentations 13b correspond to the release positions of the cable.

Preferably, in accordance with the present invention, the axes of screws 12 may be substantially perpendicular to the release surfaces 13a, 13b. Thus, the area of the surface of the studs in contact with the portions without slant 13a will be the greatest possible.

The sealing and anchorage member 8 comprises a stud 19 cooperating with a groove 20 situated in sub 1, both adapted for allowing a relative limited movement of member 8 with respect to sub 1 during release of the cable.

Member 8 is immobilized relative to sub 1 by a shear pin 11 which, when sheared, frees member 8 in translation when a tractive force is exerted on cable 4.

The end of member 8 external to sub 2 is protected mechanically by a retractable cover 20a.

The embodiment of the equipment is illustrated as follows, when the side entry sub is accessible, for example when it is close to the surface.

After removing member 8 and the guide roller 6a:
one end of the cable is inserted through side entry 5,
then member 8 is placed about cable 4,
then the member 8 is positioned in sub 1 before placing the stud 19 into groove 20 and before immobilizing member 8 by means of a shear pin 11,
cover 20a is closed, a check is made to see that sealing of the stud screws 12 is active, and
the upper end 1a of the sub is connected to the pumping installations and fluid is caused to flow.

When it is desired to anchor cable 4 to the sub, screws 12 are tightened so that the clamping element 8c and the two complementary parts or bodies 8a, 8b cooperating with this element immobilize cable 4.

For removing cable 4 from the pipe string 3, it is sufficient to carry out the preceding operations in the reverse order.

However, if for another reason it is not possible or if it is not desired, to withdraw the cable using this procedure, and this may be the case when the string is jammed in the well, it would be possible to apply a sufficient tractive force on the cable so as to shear pin 11 and thus move member 8 relatively to sub 1 over a sufficient distance so that the screws 12 no longer act on the release surfaces 13.

When screws 12 free the clamping element 8c, the cable moves freely inside member 8 and sub 1, until the cable may be completely withdrawn for carrying out operations, such as dejamming of the string, which the presence of the cable might prevent.

The cable passage stopper comprises a first chamber 21 comprising a zone substantially coaxial to the cable passage, this zone guiding a ball 23 and comprising two bearing surfaces 22 placed about the passage. These surfaces 22 are adapted for cooperating with ball 23 for closing the passage to fluid in both possible flow directions.

Initially, ball 23 is in a first position, inside a second chamber 24 which opens into the first chamber 21, for closing the passage. Member 8, inside which the first chamber 21 is located, cooperates with the second chamber 24 for separating the two chambers and acts through an opening both on the communication of the first 21 and second 24 chambers with each other and on the movement of the ball 23.

Through the second chamber 24, displacement means 25 are adapted for introducing a ball 23 into the first chamber 21. These means comprise a piston 26 having a cup for positioning ball 23. This piston 26, which is moved by a helical spring 27, is guided in the second chamber 24 by a cover 28 providing sealing between the inside and the outside of sub 1.

The internal wall of sub 1 cooperates with the seals 14 and bodies 8a, 8b, and the bearing surface 22 integral with bodies 8a, 8b cooperates with the ball 23 for completely closing the sub.

Such closure defines a second position for the stopper.

The stopper is used as follows:
once the pin 11 has been sheared and bodies 8a, 8b have moved inside sub 1,
substantially at the same time as cable 4 is released by freeing the clamping element 8c, 8b frees the movement of ball 23 which begins to penetrate into the first chamber 21 under the action of the displacement means 25,
when cable 4 has been removed from the passage which it occupies, ball 23 penetrates further into the first chamber 21,
then, when a fluid flow is established through the passage, more particularly by pumping through the pipe string through the crossing 10, ball 23 is applied against one of the bearing surfaces 22 thus pressurizing the sub 1.

The closure element, such as ball 23, could have other forms adapted to the different movements of the element in the different chambers and adapted for cooperating with one at least of the bearing surfaces 22.

Furthermore, if only a single one of the bearing surfaces cooperated with the closure element 23, it would be possible to transform the sub 1, or any other support comprising a cable passage, into a non return valve.

The axis of the second chamber 24, like that of the displacement means 25, is perpendicular to that of said first chamber but could be oblique or even parallel.

Separation of the two chambers 21 and 24 could be provided by a remote controlled member, independently of the control of the anchorage member.

Figure 2:
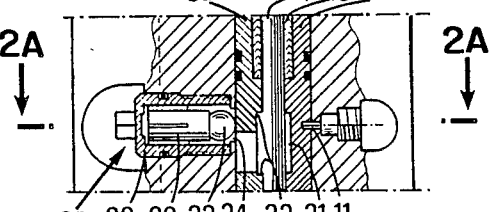
FIG. 2 is a section of a detail of the stopper, in the plane containing the axis of the cable passage.
Figure 3:
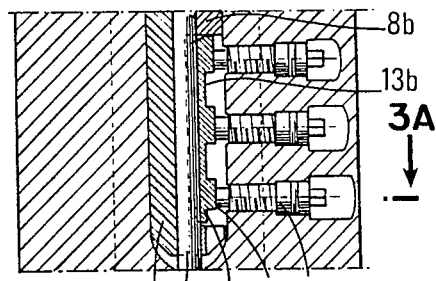
Figure 2A:
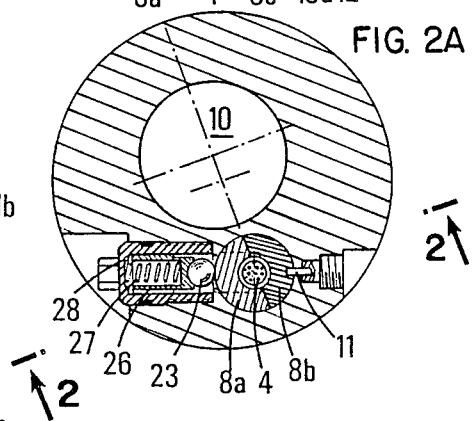
FIG. 2A is a section of the stopper through A, namely through a plane perpendicular to the longitudinal sectional plane of FIG. 1 and perpendicular to the axis of the cable passage.

In FIG. 2, the piston 26 of the displacement means 25, which is adapted for preventing ball 23 from returning to the second chamber 24, and which is also adapted for positioning ball 23 in the first chamber 21 and locking member 8 with respect to sub 1 by penetrating partially into the first chamber 21 could be replaced by several members fulfilling these functions independently of each other.

Through immobilization of ball 23 in the second chamber, it may cooperate alternately with two bearing surfaces 22 disposed in the cable passage.

In the preferred embodiment, the displacement means comprise return members, such as a spring 27, but they could comprise any other means adapted for producing movement of the closure element 23, such as a fluid flow by-passing the cable passage.

Covers may be used for applying the cable on the upper elements of the pipe string.

What is claimed is:

1. A stopper for a cable passage conduit passing through a support which comprises a first chamber placed in the passage, said first chamber comprising at least one bearing surface located in said passage and adapted to cooperate with a closure element for closing said passage, a second chamber, located in a side wall of said conduit, having an opening adapted to communicate with the first chamber, said closure element being housed in the second chamber in a first position of the stopper relative to the support, and means for moving the closure element into the first chamber at a second position of the stopper relative to the support, where the cable is withdrawn from the passage, the stopper further comprising a separating member located between said first chamber and said second chamber, said separating member being adapted for controlling the movement of the closure element from the second chamber to the first chamber.

2. Stopper as claimed in claim 1, wherein said separating member is adapted for controlling the movement of the closure element from said first chamber to said second chamber.

3. Stopper as claimed in one of claims 1 or 2, wherein said separating member is controlled by movement of the cable relative to said support.

4. Stopper as claimed in claim 3, wherein said first chamber is located inside the separating member and a displacement means for the closure element are fast with the support.

5. Stopper as claimed in claim 4, wherein said displacement means comprise return means for introducing the closure element into said first chamber.

6. Stopper as claimed in claim 5, wherein said closure element comprises a ball.

7. Stopper as claimed in claim 6, wherein said second chamber is integrated within said support.

8. Stopper as claimed in claim 7, wherein said displacement means are adapted for preventing the closure element from returning to the second chamber when said stopper is in said second position.

9. Application of the stopper as claimed in claim 8 to a ground drilling technique.

10. Application of the stopper as claimed in claim 9, wherein said stopper is adapted for closing a cable passage of a side entry sub, said sub including said support.

11. Stopper as claimed in claim 5, wherein the return means includes a spring means.

12. Stopper as claimed in claim 1 or claim 2, wherein said first chamber is located inside the separating member and a displacement means for moving the closure member are fast with the support; said separating member including the cable passage conduit and a passage adapted to extend between said first chamber and said second chamber.

13. Stopper as claimed in claim 1 or claim 2, further comprising return means for introducing the closure element into said first chamber.

14. Stopper as claimed in claim 13, wherein the return means includes spring means.

15. Stopper as claimed in claim 1 or claim 2, wherein said closure element comprises a ball.

16. Stopper as claimed in claim 1 or claim 2 wherein the second chamber is integrated within said support.

17. Stopper as claimed in claim 1 or claim 2 further comprising a displacement means adapted for preventing the closure element from returning to the second chamber when said stopper is at said second position.

18. Stopper as claimed in claim 1 further comprising two complimentary parts for forming an assembly defining said cable passage conduit, one of said parts including a passage adapted to be in communication with said first chamber and said second chamber when the stopper is at the second position.

* * * * *